United States Patent [19]
Deschenes

[11] Patent Number: 6,025,781
[45] Date of Patent: *Feb. 15, 2000

[54] DEVICE FOR USE IN DETECTING THE UNAUTHORIZED REMOVAL OF AN ARTICLE OF COMMERCE FROM A STORE OR OTHER BUSINESS ESTABLISHMENT AND METHOD OF MAKING THE SAME

[75] Inventor: Charles L. Deschenes, North Attleboro, Mass.

[73] Assignee: Avery Dennison Corporation, Pasadena, Calif.

[ * ] Notice: This patent is subject to a terminal disclaimer.

[21] Appl. No.: 08/867,348

[22] Filed: Jun. 2, 1997

Related U.S. Application Data

[60] Provisional application No. 60/037,114, Feb. 3, 1997.

[51] Int. Cl.$^7$ ................................................ G08B 13/14
[52] U.S. Cl. .................................... 340/572.8; 29/428
[58] Field of Search .......................... 340/572, 572.8, 340/572.1; 29/428

[56] References Cited

U.S. PATENT DOCUMENTS

| | | |
|---|---|---|
| 2,774,060 | 12/1956 | Thompson . |
| 4,603,326 | 7/1986 | Freed . |
| 4,751,500 | 6/1988 | Minasy et al. .............................. 340/572 |
| 4,899,134 | 2/1990 | Wheeless, Jr. ......................... 340/572 X |
| 5,357,240 | 10/1994 | Sanford et al. ......................... 340/572.8 |
| 5,426,419 | 6/1995 | Nguyen et al. ............................ 340/572 |
| 5,631,631 | 5/1997 | Deschenes ................................. 340/572 |
| 5,717,382 | 2/1998 | Cooper ...................................... 340/572 |

*Primary Examiner*—Thomas Mullen
*Attorney, Agent, or Firm*—Kriegsman & Kriegsman

[57] ABSTRACT

A device for use in detecting the unauthorized removal of an article of commerce from a store or other business establishment. The device comprises a fastener of the type constructed for use in attaching a tag to the article of commerce. The fastener includes an elongated unitary member having a first end, a second end and a flexible filament, the flexible filament interconnecting the first end and the second end. The first end is shaped to define a cross-bar insertable through an article of commerce. The second end is sized and shaped to prevent the flexible filament from being pulled completely through the article of commerce. The device further comprises an electronic article surveillance (EAS) tag which is incorporated into the fastener. The EAS tag can be commonly used tag such as an electromagnetic tag or a radio frequency tag and can be located in either the first end, the second end or in the flexible filament of the fastener. The device can be manufactured through a continuous molding process.

2 Claims, 3 Drawing Sheets

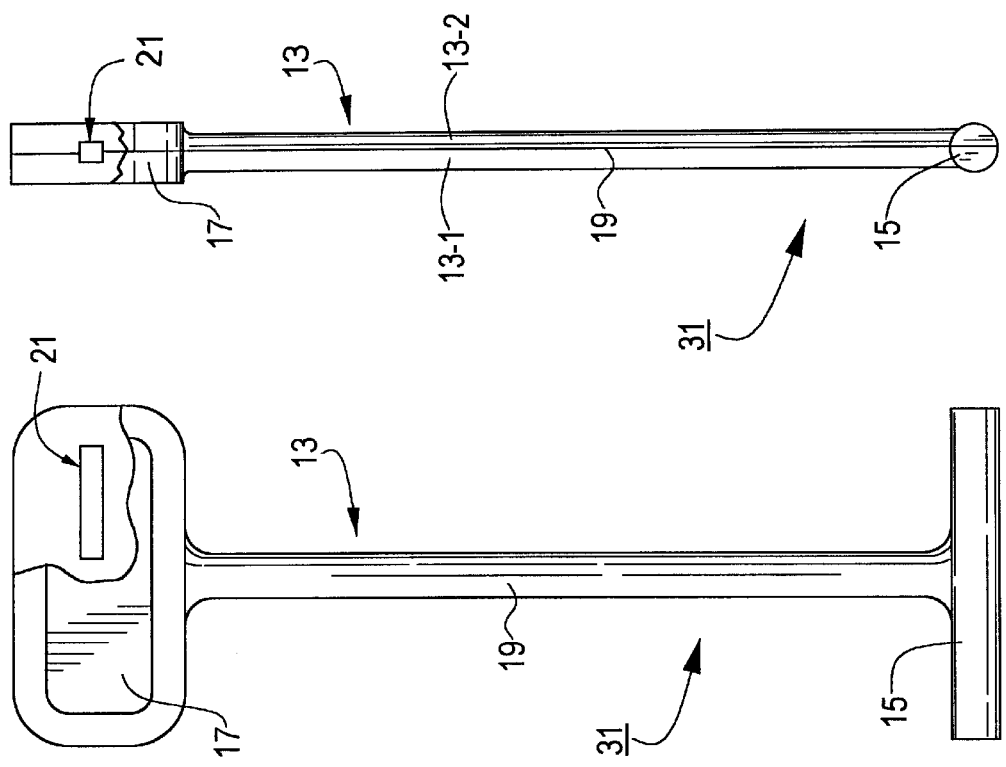
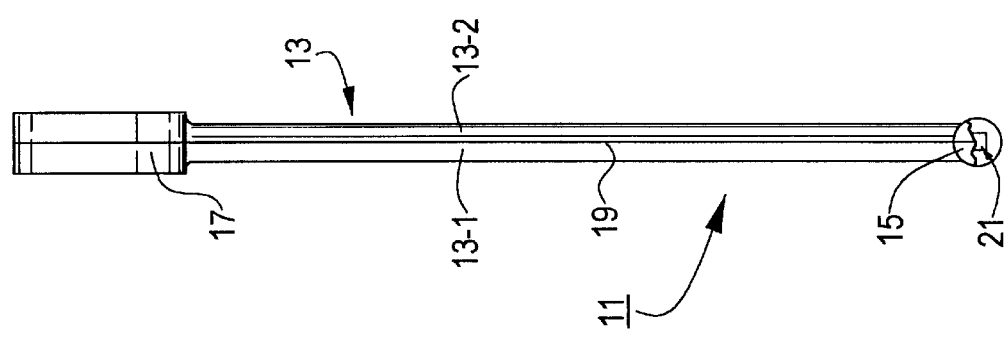
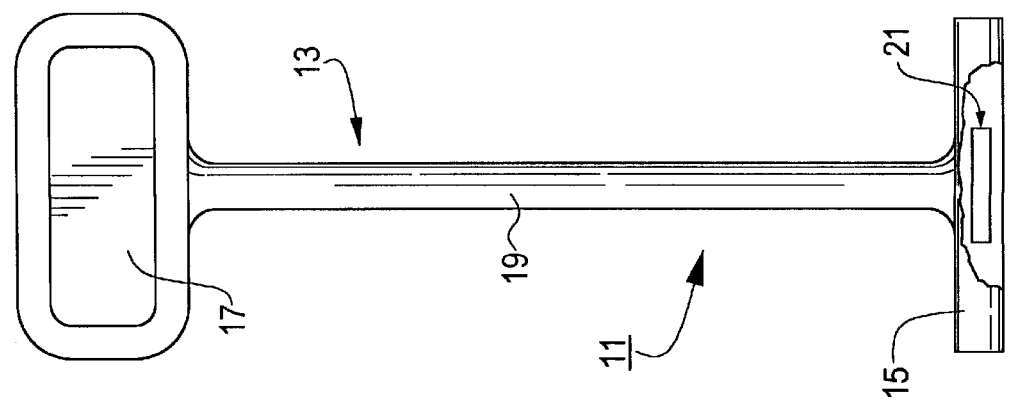

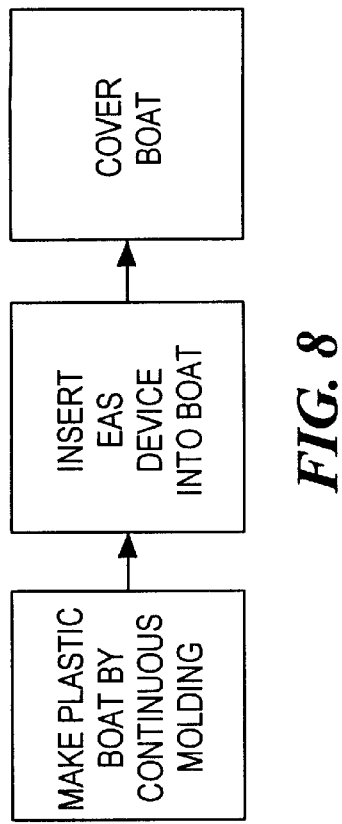
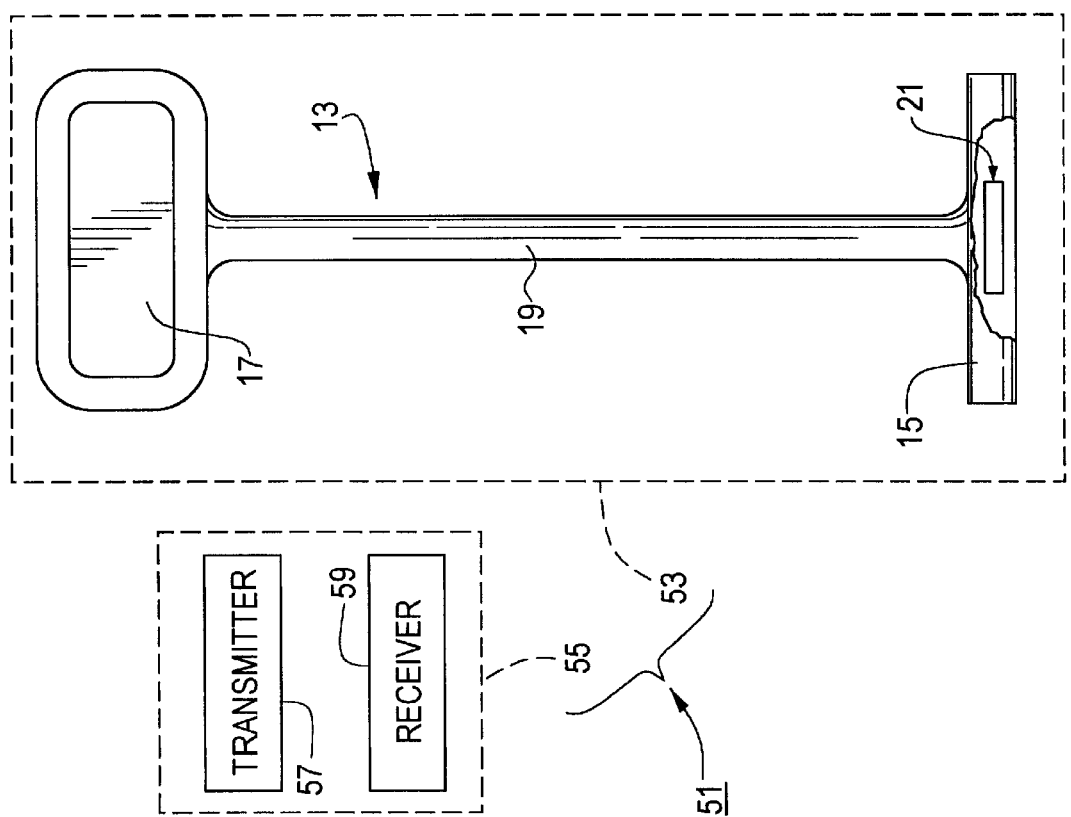

DEVICE FOR USE IN DETECTING THE UNAUTHORIZED REMOVAL OF AN ARTICLE OF COMMERCE FROM A STORE OR OTHER BUSINESS ESTABLISHMENT AND METHOD OF MAKING THE SAME

RELATED APPLICATION

This application is claiming the priority of provisional patent application 60/037,114 filed on Feb. 3, 1997 under 35 USC 119(e).

BACKGROUND OF THE INVENTION

The present invention relates to a device for use in detecting the unauthorized removal of an article of commerce from a store or other business establishment and to a method of making the same.

Plastic fasteners of the type commonly used, for example, to attach merchandise tags to articles of commerce, such as articles of clothing, are well known and are widely used in the retail industry. Typically, such fasteners comprise an elongated member having a first end shaped to defame a cross-bar (also commonly referred to as a "T-bar"), a second end, and a thin filament portion interconnecting the cross-bar and the second end. In use, the cross-bar is inserted first through a tag and then through a desired piece of fabric. The second end is appropriately sized and shaped to keep the tag from being pulled off the filament portion.

Typically, such fasteners are mass-produced by a continuous molding process in either one of two different forms known as fastener stock. One type of fastener stock, which is disclosed in commonly assigned U.S. Pat. No. 3,103,666 and which is incorporated herein by reference, comprises a plurality of fasteners joined together at their respective cross-bars by an orthogonally disposed runner bar. The other type of fastener stock, which is disclosed in commonly-assigned U.S. Pat. No. 4,955,475 and which is incorporated herein by reference, comprises a plurality of fasteners arranged in an end-to-end alignment, the ends of successive fasteners being joined together by severable connectors so as to form a continuously connected fastener stock.

The dispensing of individual fasteners from fastener stock into desired articles of commerce is typically accomplished using an apparatus commonly referred to as a "tagger gun." Examples of tagger guns are illustrated in commonly-assigned U.S. Pat. Nos. 5,320,269, 5,024,365, 4,121,487, and 4,456,161, all of which are incorporated herein by reference. Typically, a tagger gun includes (a) a hollow needle having a longitudinal slot extending across its length; (b) means for separating an individual cross-bar from the remainder of the fastener stock; and (c) means for feeding the individual cross-bar through the hollow, slotted needle and the desired article of commerce. Connections, if any, between the ends of adjacent fasteners are severed by pulling the tagger gun away from the article of commerce after the cross-bar of one of the fasteners has been inserted thereinto.

Although plastic fasteners of the type described above work well in the attachment of merchandise tags to articles of commerce, it is nonetheless known that certain unscrupulous consumers, on occasion, engage in the practice of "ticket switching" wherein the price tag for a low-priced item is switched with the price tag for a desired high-priced item using the plastic fastener from either the low-priced or the high-priced item. Various approaches to this problem have been devised. See e.g., commonly-assigned U.S. Pat. No. 5,321,872, incorporated herein by reference, wherein a tamper-resistant plastic fastener is disclosed.

Although unrelated to the use of plastic fasteners, another common problem suffered by merchants is the theft of their merchandise. One approach that has been adopted by many merchants is the attachment of theft-detection devices, such as electronic article surveillance (EAS) markers, to their articles of commerce. Such devices, which are typically quite large and conspicuous in appearance, include an activating device such as a magnet, a pair of elongated strips of magnetizable material, a miniature electronic circuit, a radio frequency transmitter/receiver or the like which may be releasably attached to the article. The activating device is constructed so as to cause an audible signal or alarm to be emitted from a detector if the article is moved past the detector.

As an example of one type of EAS device, there is disclosed in U.S. Pat. No. 4,745,401 to Montean a marker for use in radio frequency electronic article surveillance systems where the marker contains an inductive-capacitive resonant circuit and is made reversibly deactivatable and reactivatable by the addition of a piece of magnetic material and means, such as a piece of permanently magnetizable material, for biasing the first material to prevent alternating fields induced therein from changing the magnetic state of that material, thereby preventing hysteresis losses from causing a lowering of the Q of the resonant circuit below the point of detection.

As an example of another type of EAS device, there is disclosed in U.S. Pat. No. 5,357,240 to Sanford et al an electronic article surveillance (EAS) tag comprising a tag body having a central region, side wall regions connected to and integral with the central region and flap regions connected to and integral with the side wall regions. The tag body has fold lines at the junctions of the side wall regions and the flap regions. By folding the tag body along these fold lines and, in the course of the folding procedure, inserting a first magnetic element, a substantially closed box-like housing with the first magnetic element loosely housed therein is formed.

SUMMARY OF THE INVENTION

It is an object of the present invention to provide a device for use in detecting the unauthorized removal of an article of commerce from a store or other business establishment.

It is another object of the present invention to provide a method for making such a device.

Accordingly, there is provided a device for use in detecting the unauthorized removal of an article of commerce from a store or other business establishment, said device comprising in one embodiment a fastener, said fastener comprising an elongated unitary member having a first end, a second end and a flexible filament, the flexible filament interconnecting the first end and the second end, the first end being shaped to defame a cross-bar insertable through an article of commerce, the second end being sized and shaped to prevent said flexible filament from being pulled completely through the article of commerce, and a security tag incorporated into said fastener.

In another aspect of the invention, the device comprises a housing which can be mounted on an article of commerce, the housing containing an acousto magnetic type security tag.

According to another aspect of the invention, continuous molding is used in the fabrication of the device.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best deemed by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts:

FIG. 1 is an enlarged front view, broken away in part, of a first embodiment of a device constructed according to the teachings of the present invention for use in detecting the unauthorized removal of an article of commerce from a store or other business establishment;

FIG. 2 is a right side view of the device shown in FIG. 1;

FIG. 3 is an enlarged front view, broken away in part, of a second embodiment of a device constructed according to the teachings of the present invention for use in detecting the unauthorized removal of an article of commerce from a store or other business establishment;

FIG. 4 is a right side view of the device shown in FIG. 3;

FIG. 7 is an electronic article surveillance (EAS) system constructed according to the teachings of the present invention, the EAS system being shown using the device shown in FIG. 1;

FIG. 8 is a block diagram of the method of the invention.

DETAILED DESCRIPTION OF A PREFERRED EMBODIMENT

Figure 6:
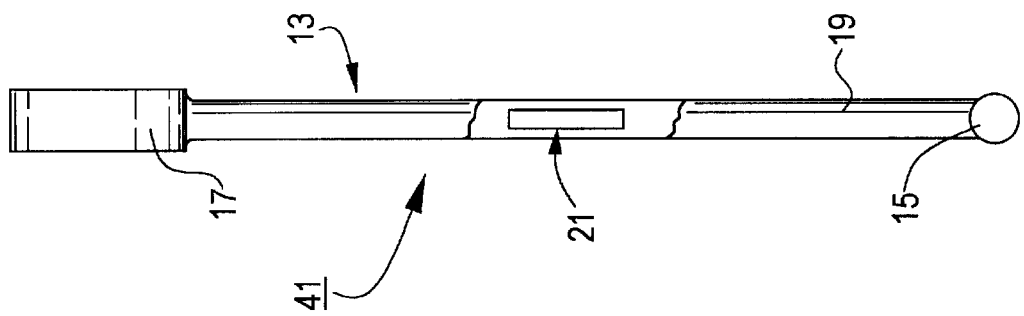
FIG. 6 is a right side view of the device shown in FIG. 5.

Referring now to FIGS. 1 and 2, there are shown enlarged front and right side views, respectively, of a first embodiment of a device constructed according to the teachings of the present invention for use in detecting the unauthorized removal of an article of commerce from a store or other business establishment, the device being represented generally by reference numeral 11.

Device 11 is generally in the shape of a fastener 13 of the type commonly used to attach a tag to a piece of fabric. Fastener 13 is preferably constructed of a plastic material such as polypropylene or nylon and is manufactured using conventional molding techniques. Fastener 13 comprises an elongated unitary member having a front end 13-1, a rear end 13-2, a first end which is shaped to define a cross-bar 15, a second end which is shaped to defame a paddle 17, and a flexible filament 19 which interconnects cross-bar 15 and paddle 17. Cross-bar 15 is appropriately sized and shaped to be dispensed through an article of commerce using a tagger gun having a hollow slotted needle. Paddle 17 is appropriately sized and shaped to prevent flexible filament 19 from being pulled completely through an article of commerce through which cross-bar 15 has previously been inserted.

Device 11 further includes a theft detection tag 21 mounted within paddle 15 of fastener 13. Theft detection tag 21 may be any well known electronic article surveillance (EAS) tag used to prevent shoplifting and similar unauthorized removal of articles from a controlled area. For example, theft detection tag 21 may comprise an activating device such as a magnet or a pair of elongated strips of magnetizable material or a miniature electronic circuit or a radio frequency (RF) transmitter/receiver or the like. If theft detection tag 21 is constructed of a magnetizable material, tag 21 may be an active marker (a marker which is detected only when magnetized) or a passive marker (a marker which is detected only when demagnetized). Furthermore, theft detection tag 21 may be of the type which is readily activatable and deactivatable.

In the preferred embodiment, theft detection tag 21 is either in the form of an EAS tag having a pair of magnetic elements of the type disclosed in U.S. Pat. No. 5,357,240 to Sanford et al, which is incorporated herein by reference or an EAS tag having an inductive-capacitance resonant circuit of the type disclosed in U.S. Pat. No. 4,745,401 to Montean.

Electromagnetic field tags, such as the type disclosed in U.S. Pat. No. 5,357,240 to Sanford et al, and radio frequency tags, such as the type disclosed in U.S. Pat. No. 4,745,401 to Montean, are both highly desirable because the relatively small size of the tags enables them to be easily disposed completely within fastener 13.

Referring now to FIG. 7, device 11 functions as part of a theft-detection or electronic article surveillance (EAS) system 51 in the following manner. For simplicity, discussion of the functionality of fastener 11 will be limited to a fastener having an electromagnetic field tag 21. Using well-known techniques, theft detection tag 21 is activated to produce an electromagnetic field 53 having a predetermined frequency. Fastener 13 is then secured to a desired article of commerce by inserting cross-bar 13 through the article. Preferably a tagger gun is used to insert cross-bar 13 through the article.

Typically, a magnetic field sensor 55 is located at the egress of the room where the article is located. Magnetic field sensor 55 comprises a transmitter 57 and a receiver 59 which may be electronic article surveillance system components of known type; however, it is to be understood that transmitter 57 and receiver 59 need not be housed within the same sensor 55. Transmitter 57 of magnetic field sensor 55 produces a signal at a particular frequency. As fastener 13 is brought closer to sensor 55, electromagnetic field 53 produced by tag 21 will cause the signal produced by transmitter 57 to reradiate at a different frequency. The reradiation of the signal produced by transmitter 57 at a different frequency is subsequently picked up by receiver 59. Receiver 59 of magnetic field sensor 55, upon detecting the specific frequency reradiated by fastener 11, will then cause sensor 55 to emit a visual and/or audio signal to notify of the potential theft of the article. To preclude sensor 55 from activating the alarm, such as if removal of the article is authorized, tag 21 is of the type which can be readily deactivated, such as by using a large magnetizable device which alters the electromagnetic field produced by tag 21, so as to prevent it from triggering magnetic field sensor 55.

Figure 5:
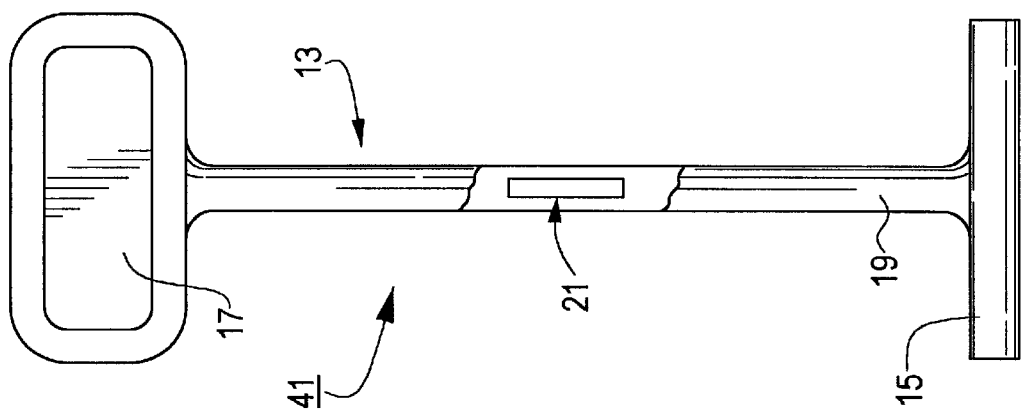
FIG. 5 is an enlarged front view, broken away in part, of a third embodiment of a device constructed according to the teachings of the present invention for use in detecting the unauthorized removal of an article of commerce from a store or other business establishment.

It should be noted that although theft detection tag 21 is shown in FIGS. 1 and 2 as being mounted within crossbar 15 of fastener 13, member 21 could alternatively be located in any other portion of fastener 13, such as in filament 19 or in paddle 17. For example, in FIGS. 3 and 4, a second embodiment of a device for use in detecting the unauthorized removal of an article of commerce from a store or other business establishment is shown, the device being identified by reference numeral 31. Device 31 is identical to device 11 in all regards except that in device 31 theft detection tag 21 is mounted within paddle 17 of fastener 13 rather than crossbar 15. In addition, in FIGS. 5 and 6, a third embodiment of a device for use in detecting the unauthorized removal of an article of commerce from a store or other business establishment is shown, the device being identified by reference numeral 41. Device 41 is identical to device 11 in all regards except that in device 41 theft detection tag 21 is mounted within flexible filament 19 rather than crossbar 15. Devices 11, 31 and 41 can all be constructed through a process 61 which includes continuous molding as shown in FIG. 8. The continuous molding comprises extrusion in-line with open casting to a rotating mold wheel. It should be noted that other devices, not necessarily in the same shape as devices 11, 31 and 41 could similarly be constructed through process 61. For example, a rectangular EAS tag could be also formed through this method.

The method comprises the following steps. First, a plurality of plastic boats interconnected in a string configuration are formed by continuous molding using extrusion in-line with open casting into a rotating mold wheel. The boats may be in the shape of fasteners. The plastic is any thermoplastic such as polypropylene and is extruded into suitably spaced depressions in the mold wheel using an extruding die.

Then, excess material is removed.

Then, the string is removed from the mold wheel.

Then, an EAS device is inserted into each boat.

Then, a cover is attached to the top of the boat to secure the EAS device inside the boat. The cover may be for example an adhesive coated paper or a liquid casting.

The embodiments of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A fastener assembly for use in detecting the unauthorized removal of an article of commerce from a store or other business establishment, said fastener assembly comprising:

a) a fastener, said fastener comprising an elongated unitary member made of plastic and having a first end, a second end and a flexible filament, the flexible filament interconnecting the first end and the second end, the first end being shaped to define a cross-bar insertable through an article of commerce, the second end being sized and shaped to prevent said flexible filament from being pulled completely through the article of commerce; and b) an EAS security tag mounted within said fastener, said EAS security tag comprising a tag housing and a magnetic element disposed in the tag housing.

2. A fastener assembly for use in detecting the unauthorized removal of an article of commerce from a store or other business establishment, said fastener assembly comprising:

a) a fastener, said fastener comprising an elongated unitary member made of plastic and having a first end, a second end and a flexible filament, the flexible filament interconnecting the first end and the second end, the first end being shaped to define a cross-bar insertable through an article of commerce, the second end being sized and shaped to prevent said flexible filament from being pulled completely through the article of commerce; and b) an EAS security tag mounted within said fastener, said EAS security tag comprising a radio frequency marker.

* * * * *